(12) United States Patent
Chae et al.

(10) Patent No.: US 9,823,509 B2
(45) Date of Patent: Nov. 21, 2017

(54) DISPLAY DEVICE

(71) Applicant: SAMSUNG DISPLAY CO., LTD., Yongin, Gyeonggi-Do (KR)

(72) Inventors: Kyunghoon Chae, Cheonan-si (KR); Suyoung Yun, Asan-si (KR); Yongil Kim, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 134 days.

(21) Appl. No.: 14/748,414

(22) Filed: Jun. 24, 2015

(65) Prior Publication Data
US 2016/0109089 A1 Apr. 21, 2016

(30) Foreign Application Priority Data
Oct. 17, 2014 (KR) .................. 10-2014-0140832

(51) Int. Cl.
*G02F 1/1335* (2006.01)

(52) U.S. Cl.
CPC .. *G02F 1/133608* (2013.01); *G02F 1/133606* (2013.01); *G02F 1/133603* (2013.01)

(58) Field of Classification Search
CPC ......... G02F 1/133608; G02F 1/133606; G02F 1/133603

USPC ........................................................ 349/64
See application file for complete search history.

(56) References Cited

U.S. PATENT DOCUMENTS

| | | | |
|---|---|---|---|
| 2006/0104083 A1* | 5/2006 | Kwon | G02F 1/133608 362/559 |
| 2007/0013825 A1* | 1/2007 | Kim | G02F 1/133608 349/58 |
| 2008/0049161 A1 | 2/2008 | Kim et al. | |
| 2010/0073596 A1 | 3/2010 | Jeong et al. | |
| 2013/0314899 A1 | 11/2013 | Ye et al. | |

FOREIGN PATENT DOCUMENTS

| | | |
|---|---|---|
| JP | 2009-272199 | 11/2009 |
| KR | 10-2008-0010836 A | 1/2008 |
| KR | 10-2008-0011787 A | 2/2008 |
| KR | 10-2010-0033196 A | 3/2010 |
| KR | 10-2013-0132192 A | 12/2013 |

* cited by examiner

*Primary Examiner* — Lucy Chien
(74) *Attorney, Agent, or Firm* — Lee & Morse P.C.

(57) ABSTRACT

A display device includes a display panel, a light source providing light to the display panel, a bottom chassis, the light source being positioned on the bottom chassis, a diffuser plate between the light source and the display panel, the diffuser plate directing light emitted from the light source toward the display panel, and a supporter between the bottom chassis and the diffuser plate to support the diffuser plate, the supporter including a support portion that is at least partially bent.

20 Claims, 7 Drawing Sheets

DISPLAY DEVICE

CROSS-REFERENCE TO RELATED APPLICATION

Korean Patent Application No. 10-2014-0140832, filed on Oct. 17, 2014, in the Korean Intellectual Property Office, and entitled: "Display Device," is incorporated by reference herein in its entirety.

BACKGROUND

1. Field

Embodiments relate to a display device including a supporter that supports a diffuser plate of a backlight unit.

2. Description of the Related Art

In general, flat panel display devices, e.g., a liquid crystal display and an organic light emitting display, include a plurality of electrode pairs generating an electric field and an electro-optical active layer interposed therebetween. The liquid crystal display (LCD) may include a liquid crystal layer as the electro-optical active layer, and the organic light emitting display may include an organic light emitting layer as the electro-optical active layer.

The liquid crystal display includes a liquid crystal panel assembly. The liquid crystal panel assembly includes a backlight unit and a liquid crystal panel. The backlight unit is disposed on the back-side of the liquid crystal panel.

The backlight unit may be categorized into the followings: an edge-lit backlight unit where a light source is disposed at the side portion of the liquid crystal panel so that a light guide plate may be required, and a direct-lit backlight unit where a light source is disposed at the bottom portion thereof so that a light guide plate may not be required. The direct-lit backlight unit with the light source disposed directly under the liquid crystal panel uses a supporter so as to prevent subsidence of a diffuser plate and an optical sheet.

SUMMARY

According to an embodiment, a display device includes a display panel, a light source providing light to the display panel, a bottom chassis, the light source being positioned on the bottom chassis, a diffuser plate between the light source and the display panel, the diffuser plate directing light emitted from the light source toward the display panel, and a supporter between the bottom chassis and the diffuser plate to support the diffuser plate, the supporter including a support portion that is at least partially bent.

The supporter may be made of a transparent material.

The support portion of the supporter may be in contact with the diffuser plate.

The supporter may include: a base portion connected to the support portion and fixing the support portion to the bottom chassis; and a coupling projection protruding from the base portion.

The bottom chassis may have a coupling hole into which the coupling projection is inserted.

The light source may include first, second, third and fourth light sources respectively disposed at vertices of a quadrangle in a plane.

The supporter may be disposed at a center point of the quadrangle that the first, second, third and fourth light sources form.

According to another embodiment, a display device includes a display panel, a light source providing light to the display panel, a bottom chassis on which the light source is disposed, a diffuser plate disposed between the light source and the display panel and directing light emitted from the light source to the display panel, and a supporter disposed between the bottom chassis and the diffuser plate and supporting the diffuser plate. The supporter includes: a base portion fixed to the bottom chassis, a support portion extending from the base portion and forming an acute angle with the base portion, and a coupling projection protruding from the base portion.

The supporter may be made of a transparent material.

The support portion of the supporter may be in contact with the diffuser plate.

The bottom chassis may have a coupling hole into which the coupling projection is inserted.

The light source may include first, second, third and fourth light sources respectively disposed at vertices of a quadrangle in a plane.

The supporter may be disposed at a center point of the quadrangle that the first, second, third and fourth light sources form.

According to yet another embodiment, a display device includes a display device comprising: a display panel, a light source providing light to the display panel; a bottom chassis on which the light source is disposed, a diffuser plate disposed between the light source and the display panel and directing light emitted from the light source to the display panel, and a supporter disposed between the bottom chassis and the diffuser plate and supporting the diffuser plate. The supporter includes a base portion fixed to the bottom chassis, a support portion extending from the base portion and disposed in contact with the diffuser plate, and a coupling projection protruding from the base portion. The support portion may have a bent portion that is bent in a direction perpendicular to a longitudinal direction.

The supporter may be made of a transparent material.

The support portion of the supporter may be in contact with the diffuser plate.

The bottom chassis may have a coupling hole into which the coupling projection is inserted.

The light source may include first, second, third and fourth light sources respectively disposed at vertices of a quadrangle in a plane.

The supporter may be disposed at a center point of the quadrangle that the first, second, third and fourth light sources form.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

The embodiments are defined by the scope of the claims. Therefore, well-known constituent elements, operations and techniques are not described in detail in the embodiments in order to prevent obscure interpretation. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer or element is referred to as being "connected" to another element, it can be directly connected to the other element or be, e.g., electrically, connected to the other element with one or more intervening elements interposed therebetween. In addition, it will also be understood that when a layer is referred to as being "between" two layers, it can be the only layer between the two layers, or one or more intervening layers may also be present. Like reference numerals refer to like elements throughout.

It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to one embodiment is described with reference to FIGS. 1 and 2.

Figure 1:
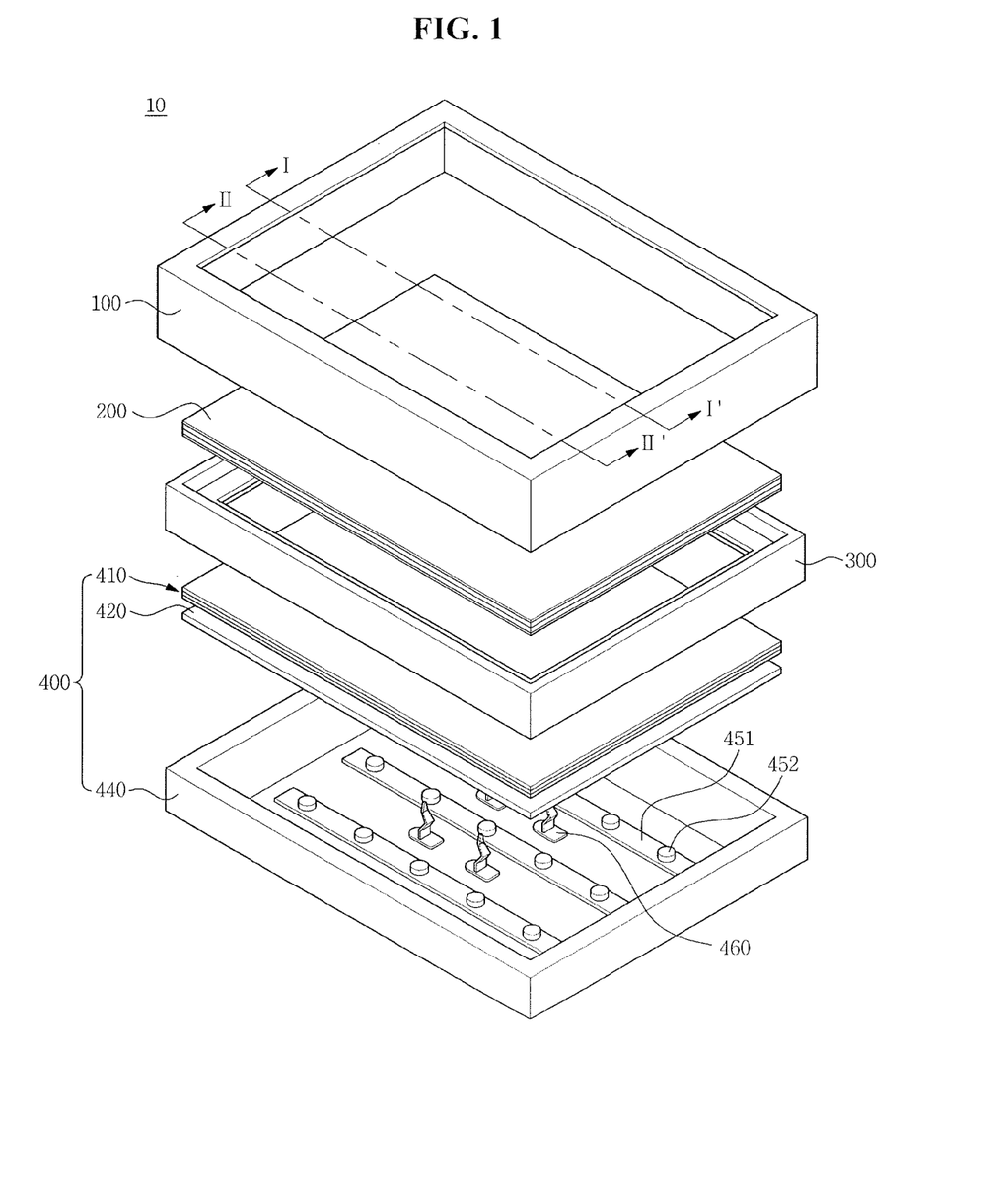
FIG. 1 illustrates a schematic exploded perspective view of a display device according to one embodiment.
Figure 2:
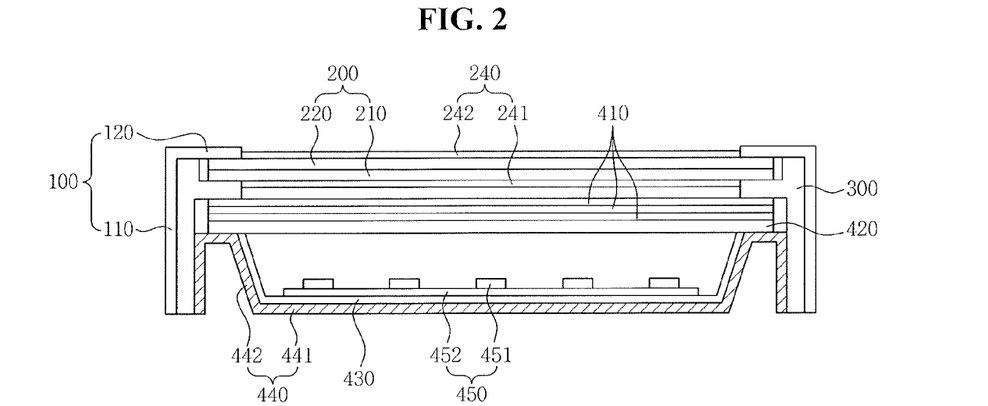
FIG. 2 illustrates a schematic cross-sectional view along line I-I' of FIG. 1.

FIG. 1 illustrates a schematic exploded perspective view of a display device according to one embodiment, and FIG. 2 is a cross-sectional view taken along line I-I' of FIG. 1. It is noted that line I-I' of FIG. 1 intersects a light source unit.

Referring to FIGS. 1 and 2, a display device 10 may include a display panel 200, a backlight assembly 400 providing light to the display panel 200, a top chassis 100 surrounding the display panel 200, and a mold frame 300 on which the display panel 200 is seated.

The top chassis 100 is coupled to a bottom chassis 440 or the mold frame 300 so as to cover the display panel 200 mounted on the mold frame 300. The top chassis 100 has an opening at a center portion thereof to expose the display panel 200. The top chassis 100 may be disposed to cover an edge portion of an upper surface and side surfaces of the display panel 200. As illustrated in FIG. 2, the top chassis 100 may have a side surface portion 110 configured to cover the side surfaces of the display panel 200 and a bent portion 120 bent from the side surface portion 110 and configured to cover the edge portion of the upper surface of the display panel 200.

The top chassis 100 may be coupled to the bottom chassis 440 or the mold frame 300 by hooks and/or screws. Further, the top chassis 100 and the bottom chassis 440 or the mold frame 300 may be coupled to each other in a variety of methods.

The display panel 200 is configured to display an image. The display panel 200 may be a light-receiving type display panel and may be categorized into, e.g., a LCD panel, an electrowetting display panel, an electrophoretic display panel, a microelectromechanical system (MEMS) display panel, and the like. As an example, a LCD panel is used as the display panel 200 in the present embodiment.

The display panel 200 may be provided in a quadrangular panel form having two pairs of parallel sides. According to one embodiment, the display panel 200 may have a rectangular form having a pair of long sides and a pair of short sides. As illustrated in FIG. 2, the display panel 200 may include a first substrate 210, a second substrate 220 opposed to the first substrate 210, and a liquid crystal layer interposed between the first and second substrates 210 and 220. The display panel 200 has, when viewed in top plane view, a display area which displays an image and a non-display area which surrounds the display area and does not display an image. The non-display area is covered by the top chassis 100, e.g., the non-display area may be covered by the bent portion 120 of the top chassis 100.

The first substrate 210 may include a plurality of pixel electrodes and a plurality of TFTs electrically connected to the pixel electrodes in one-to-one correspondence. The respective TFTs function as switches of driving signals supplied to the corresponding pixel electrodes. Further, the second substrate 220 may include a common electrode forming, along with the pixel electrodes, an electric field that controls an alignment of the liquid crystals. The display panel 200 is configured to drive the liquid crystal layer to display an image frontwardly.

The display panel 200 may include a driving chip configured to supply a driving signal, a tape carrier package (TCP) on which the driving chip is mounted, and a printed circuit board electrically connected to the display panel 200 through the TCP. The driving chip generates a driving signal to drive the display panel 200 in response to an external signal. The external signal refers to a signal supplied from the printed circuit board and includes image signals, a variety of control signals, and driving voltages.

A polarizer 240 is disposed on the display panel 200 and includes first and second polarizers 241 and 242. The first and second polarizers 241 and 242 are respectively disposed on surfaces of the first and second substrates 210 and 220 opposite from facing surfaces thereof. That is, the first polarizer 241 may be attached on an outer side of the first substrate 210 and the second polarizer 242 may be attached on an outer side of the second substrate 220. A transmission axis of the first polarizer 241 is substantially at a right angle with respect to a transmission axis of the second polarizer 242.

The mold frame 300 is coupled to the bottom chassis 440 and accommodates the display panel 200. For example, the mold frame 300 may be formed of a flexible material, e.g., plastic, in order to prevent damage on the display panel 200.

The mold frame 300 is provided along the edge portion of the display panel 200 and supports the display panel 200 from the bottom thereof. The mold frame 300 is configured to fix or support additional elements, e.g., an optical sheet 410 and a diffuser plate 420. The mold frame 300 may be provided in areas corresponding to four sides or at least a part of the four sides of the display panel 200. For example, the mold frame 300 may have a quadrilateral-loop form corresponding to the four sides of the display panel 200, or may have a C-shape, that is a quadrilateral open-loop form corresponding to three sides of the edge portion of the display panel 200.

As illustrated in FIG. 2, the mold frame 300 may be coupled to the top chassis 100. For example, a screw hole may be formed on the top chassis 100, the bottom chassis 440, and the mold frame 300, and then the top chassis 100, the bottom chassis 440, and the mold frame 300 may be coupled to each other at a time by a screw. Further, the top chassis 100, the bottom chassis 440, and the mold frame 300 may be coupled to each other to be fixed in a variety of methods.

The backlight assembly 400 may include the optical sheet 410, the diffuser plate 420, a reflective sheet 430, the bottom chassis 440, a light source unit 450, and a supporter 460.

The light source unit 450 may include at least one light source 451 and a circuit substrate 452 on which the at least one light source 451 is disposed. For example, as illustrated in FIG. 1, the circuit substrate 452 may include a plurality of strips spaced apart from each other on the bottom chassis 440, with a plurality of light sources 451 on positioned on each strip. The light source unit 450 may be disposed at a bottom portion of the display panel 200. For example, the light source unit 450 may be disposed on one of, e.g., bottom surface of, the reflective sheet 430 or the bottom chassis 440.

The circuit substrate 452 may have a quadrangular form and have a reflective surface. For example, a surface of the circuit substrate 452 may be processed with a reflective material. Further, the circuit substrate 452 may be made of a metal material to perform heat dissipation and accommodation functions. In this case, any metal material can be used without limitation and thus a variety of metal materials having high thermal conductivity may be used.

The light source 451 may include a light emitting diode (LED) and the like. A plurality of light sources 451 may provide light for the display device 10 to display image information. Light emitted from the light sources 451 is guided toward the display panel 200 via the diffuser plate 420 and the optical sheet 410. The light sources 451 may be spaced a predetermined distance apart from each other in order to achieve luminance uniformity. In some embodiments, the plurality of light sources 451 may be spaced an equal distance apart from each other in width and length directions in a matrix form. In some embodiments, the light sources 451 may be disposed in a row in a length direction but disposed in zigzag in the width direction. In some embodiments, the light sources 451 may be disposed in a row in the width direction but disposed in zigzag in the length direction. However, embodiments are not limited thereto, and thus the light sources 451 may be disposed on the circuit substrate 452 in a variety of ways in order to achieve luminance uniformity of the light source unit 450. Further, a coupling hole may be defined on the circuit substrate 452 to allow a coupling member to be inserted and fixed thereto.

The diffuser plate 420 is disposed on, e.g., above, the light source unit 450. The diffuser plate 420 receives light emitted from the light source unit 450 to diffuse the light. That is, the diffuser plate 420 may function to improve luminance uniformity of light emitted from the light source unit 450. In more detail, the diffuser plate 420 allows a bright spot, which appears as a bright point in accordance with a disposition of the light sources 451, not to be seen from the front side of the display device 10. Further, the diffuser plate 420 may be spaced a predetermined distance apart from the light source unit 450 with an air layer interposed therebetween.

The diffuser plate 420 is fixed to the bottom chassis 440. The diffuser plate 420 may be provided, e.g., in a quadrilateral-panel form like the display panel 200. However, embodiments are not limited thereto, and thus when an LED is used as the light source 451, the diffuser plate 420 may be provided in many different forms and may include predetermined grooves, protrusions, and the like depending on the position of the light source 451.

The diffuser plate 420 is described as a plate for ease of description, but it may be provided in a sheet or film form to achieve slimness of the display device 10. That is, the diffuser plate 420 is to be understood as having a concept that includes not only a plate but also a film for guiding light.

The diffuser plate 420 may be formed of a light-transmissive material. Examples of the light-transmissive material may include acrylic resins, e.g., polymethylmethacrylate (PMMA), polycarbonate (PC), etc. so as to guide light efficiently.

The optical sheet 410 is disposed on the diffuser plate 420 and is configured to diffuse and/or collect light transmitted from the diffuser plate 420. The optical sheet 410 may include a diffusion sheet, a prism sheet, and a protective sheet. The diffusion sheet of the optical sheet 410 is configured to disperse light incident from the diffuser plate 420 so as to prevent the light from being partly concentrated. The prism sheet of the optical sheet 410 may include prisms having a triangular cross-section and formed in a predetermined array on one surface thereof. The prism sheet may be disposed on the diffusion sheet and may collect light diffused from the diffusion sheet in a direction perpendicular to the display panel 200. The protective sheet of the optical sheet 410 may be formed on the prism sheet and may serve to protect a surface of the prism sheet and diffuse light to achieve a uniform light distribution.

The reflective sheet 430 is disposed between the light source unit 450 and the bottom chassis 440. The reflective sheet 430 reflects light emitted downward from the diffuser plate 420 to be directed toward the display panel 200, thereby improving light efficiency.

The reflective sheet 430 may have a bottom portion and a wing portion extending from the bottom portion to form an obtuse angle with the bottom portion. The bottom portion of the reflective sheet 430 may be mounted on the bottom chassis 440, and the wing portion of the reflective sheet 430 may be disposed on a side wall 442 of the bottom chassis 440.

The reflective sheet 430 may be formed of, e.g., polyethylene terephthalate (PET) so as to possess reflectivity. One surface of the reflective sheet 430 may be coated with a diffusion layer containing, e.g., titanium dioxide. In some embodiments, the reflective sheet 430 may be formed of a material containing metal, e.g., silver (Ag).

The bottom chassis 440 accommodates the reflective sheet 430 and the diffuser plate 420. The bottom chassis 440 has a bottom portion 441 and the side wall 442 bent from the bottom portion 441. The bottom portion 441 of the bottom chassis 440 is parallel to the diffuser plate 420. The side wall 442 supports the diffuser plate 420 and is coupled to the mold frame 300.

The bottom chassis 440 may be formed of a rigid metal material, e.g., stainless steel, or a material having good heat dissipation properties, e.g., aluminum or an aluminum alloy. The bottom chassis 440 according to one embodiment may be responsible for maintaining a framework of the display device 10 and protecting a variety of elements accommodated therein.

Figure 3:
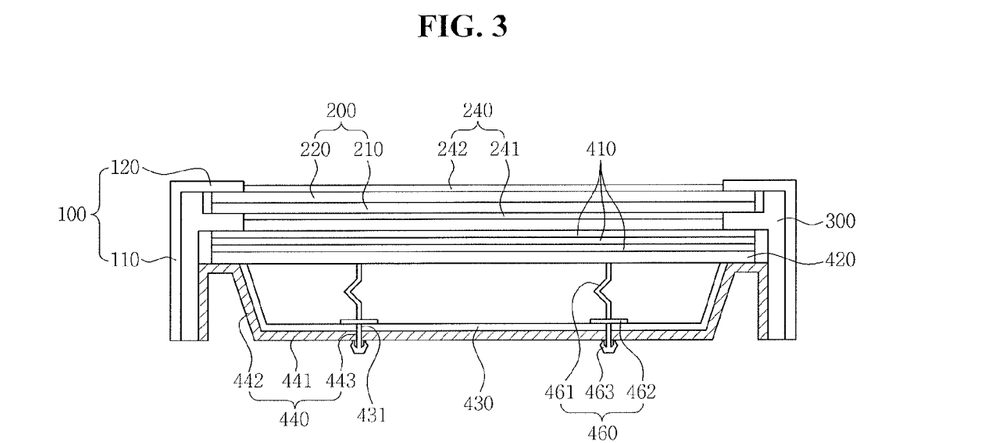
FIG. 3 illustrates a schematic cross-sectional view along line II-II' of FIG. 1.

FIG. 3 is a schematic cross-sectional view illustrating the display device 10 taken along line II-II' of FIG. 1. It is noted that line II-II' of FIG. 1 intersects the supporter 460.

Figure 4A:
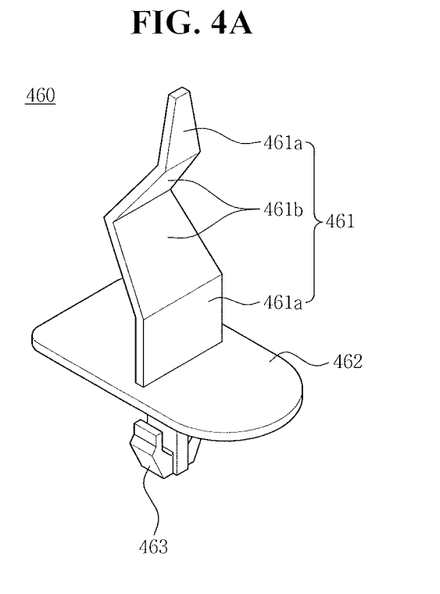
FIGS. 4A to 4C illustrate an enlarged perspective view, a enlarged side view, and an enlarged front view, respectively, of the supporter in FIG. 1.
Figure 4B:
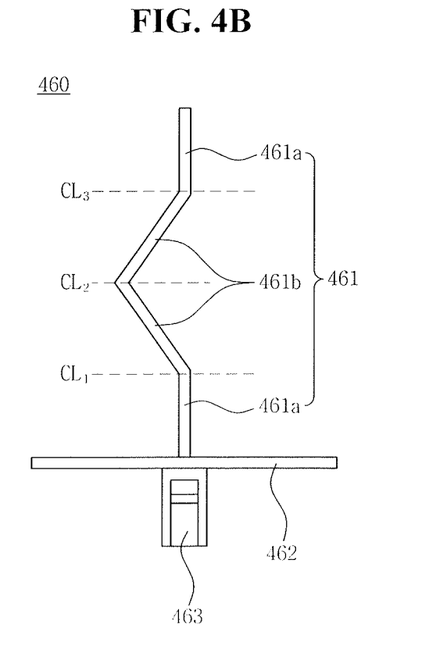
Figure 4C:
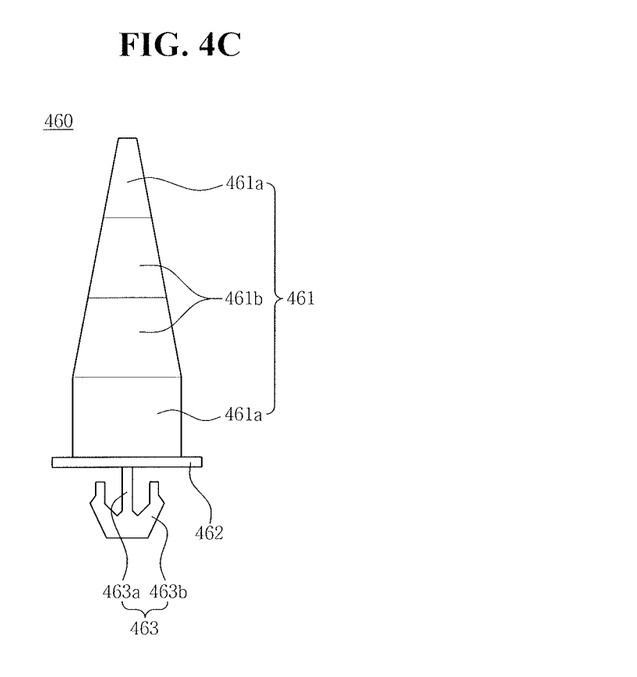
Figure 5:
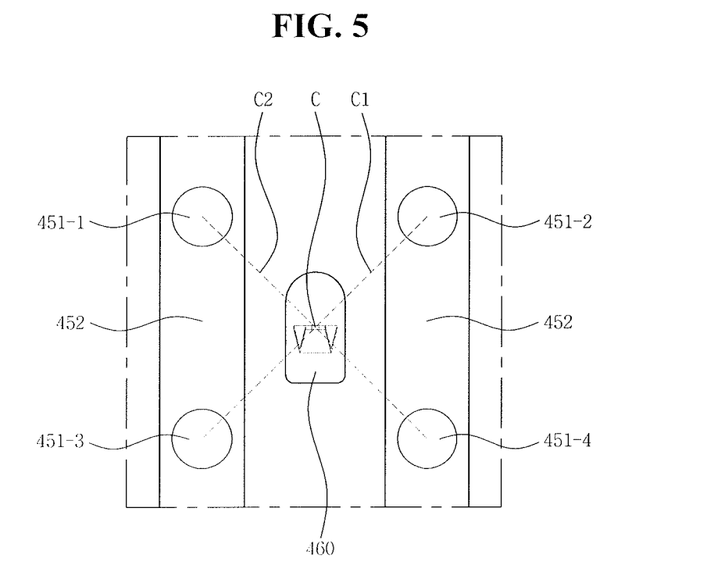
FIG. 5 illustrates a view of an arrangement relationship between a supporter according to one embodiment and a plurality of light sources adjacent to the supporter.

FIGS. 4A to 4C illustrate a schematic perspective view, a schematic side view, and a schematic front view, respectively, of the supporter 460. FIG. 5 illustrates an arrangement relationship between the supporter 460 and the plurality of light sources 451.

Referring to FIGS. 3 to 5, the supporter 460 is disposed between the diffuser plate 420 and the bottom chassis 440 to support the diffuser plate 420. If the diffuser plate 420 were to be supported by the side wall 442 of the bottom chassis 440 only at the edge portions, a center portion of the diffuser plate 420 would subside, e.g., sag. Further, an increased size of a screen of a display device would increase such sagging of the diffuser plate 420. Accordingly, the supporter 460 according to embodiments is disposed at the center portion of the bottom chassis 440 to support the center portion of the diffuser plate 420.

FIG. 1 illustrates four supporters 460 at the center portion of the bottom chassis 440. However, the four supporters 460 illustrated in FIG. 1 are just one embodiment, e.g., only one supporter 460 or any suitable number of supporters 460 may be provided in consideration of size and weight of the diffuser plate 420.

Referring to FIGS. 4A-4C, the supporter 460 according to one embodiment includes a support portion 461, a base portion 462, and a coupling projection 463. The supporter 460 may be provided in a flat panel form that has a small thickness. Further, the supporter 460 may be formed of a transparent material that allows light transmission, e.g., transparent plastics such as polycarbonate. Herein, the term "transparent" means a transmittance of about 85% or more.

The support portion 461 is provided in a flat panel form and includes a transparent material. Any material that is transparent and is capable of supporting weight of the diffuser plate 420 can be used to form the support portion 461. For example, the support portion 461 may be made of transparent plastics or transparent resins. As illustrated in FIG. 3, the support portion 461 is disposed under the diffuser plate 420, i.e., on the bottom portion 441 of the bottom chassis 440, to support the diffuser plate 420.

The support portion 461 is at least partially bent. For example, as illustrated in FIG. 4B, the support portion 461 is bent at first, second, and third center lines CL1, CL2, and CL3. In more detail, as illustrated in FIGS. 4A-4B, a first step 461a of the support portion 461 is in contact with a bottom surface of the diffuser plate 420 and is connected to the base portion 462. The first step 461a of the support portion 461 is perpendicular to the base portion 462. For example, as illustrated in FIGS. 4A-4B, two first steps 461a of the support portion 461 may be vertically spaced apart form each other, a top first step 461a, e.g., directly, contacting the diffuser plate 420, and a bottom first step 461a, e.g., directly, contacting the base portion 462. A second step 461b of the support portion 461 is disposed between the two first steps 461, and is bent at the second center line CL2. A top of the second step 461b contacts and is bent relative to the top first step 461a at the first center line CL1 to define an obtuse angle, and a bottom of the second step 461b contacts and is bent relative to the bottom first step 461a at the third center line CL3 to define an obtuse angle.

As the support portion 461 is at least partially bent, in contrast to a conventional supporter, light reflected from the support portion 461 is attenuated. As the light reflected from the support portion 461 is attenuated, light interference by the supporter 460 is reduced and shadows produced by light interference appear less. That is, the supporter 461 is at least partially bent, so as to minimize interference of light L emitted from adjacent light sources 451.

The support portion 461 is formed into a flat panel form to be as thin as possible, as illustrated in the cross-section of FIG. 4B. When the thickness of the support portion 461 is minimized, shadow cast by the light L emitted from the plurality of light sources 451 disposed therearound may be prevented or substantially minimized. Herein, the flat panel form of the support portion 461 refers to a thin panel, e.g., sheet, that is flat and has front and rear surfaces parallel to each other. Accordingly, the support portion 461 is formed to be as thin as possible, as long as it is capable of supporting the weight of the diffuser plate 420.

The base portion 462 is connected to the first step 461a of the support portion 461 and fixes the support portion 461 to the backlight unit 400, i.e., to the bottom chassis 440. The base portion 462 is perpendicularly connected to the support portion 461 and allows the support portion 461 to form a right angle with respect to the bottom portion 441 of the bottom chassis 440. The base portion 462 may have various cross-sections such as a circle, a quadrangle, and a square, but the base portion 462 according to one embodiment of the present invention is formed to have a quadrangular cross-section in top view, as illustrated in FIG. 5.

The coupling projection 463 protrudes from the base portion 462. The coupling projection 463 provides a coupling force, thereby allowing the supporter 460 to be firmly fixed to the bottom chassis 440.

The coupling projection 463 is inserted through an inserting hole 431 in the reflective sheet 430 and through a coupling hole 443 in the bottom portion 441. The coupling projection 463 includes an inserting body 463a and a locking hook 463b, as illustrated in FIG. 4C. The form of the locking hook 463b may vary. For example, the locking hook 463b may have a sphere or a poly-pyramid form connected to an end portion of the inserting body 463a. The locking hook 463b passes through the inserting hole 431 and the coupling hole 443 to be located outside of the bottom portion 441, as illustrated in FIG. 3.

As illustrated in FIG. 5, the supporter 460 is disposed at a center portion of the plurality of adjacent light sources 451, such that a shadow may not be cast by the plurality of adjacent light sources 451. That is, the supporter 460 may be disposed at the center of a figure that the plurality of adjacent light sources 451 makes. For example, as illustrated in FIG. 5, when adjacent four light sources 451-1, 451-2, 451-3, and 451-4 are disposed to form a quadrangle, the supporter 460 may be disposed at a crossing point C of two diagonal lines C1,C2 connecting the four light sources 451-1, 451-2, 451-3, and 451-4.

Further, the supporter 460 is disposed to support the center portion of the diffuser plate 420. For instance, when four supporters 460 support the diffuser plate 420, the four supporters 460 may be disposed, as illustrated in FIG. 1, at the center portion of the bottom chassis 440 corresponding to the center portion of the diffuser plate 420. In this case, each supporter 460 is disposed at the center portion of the four adjacently disposed light sources 451.

As the supporter 460 is formed of a transparent material having a thin panel form and includes the support portion 461 that is at least partially bent, as described above, most light emitted from the light sources 451 passes through the supporter 460 and light interference by the supporter 460 is minimized, thereby preventing shadow of the supporter 460 on a screen due to the light sources 451 around the supporter 460. Therefore, if the diffuser plate 420 is supported by the supporter 460 according to one embodiment, the shadow of the supporter 460 may not be cast on the screen, although the number of the light sources 451 is reduced and the thickness of the diffuser plate 420 is increased in the backlight unit 10, thereby reducing costs and increasing savings.

Hereinafter, supporters 560, 660, 760, 860, 960, and 1060 according to other embodiments are described with reference to FIGS. 6A to 6F. Configurations that are the same as that of the embodiment in FIGS. 1-5 will be omitted for ease of description.

Figure 6A:
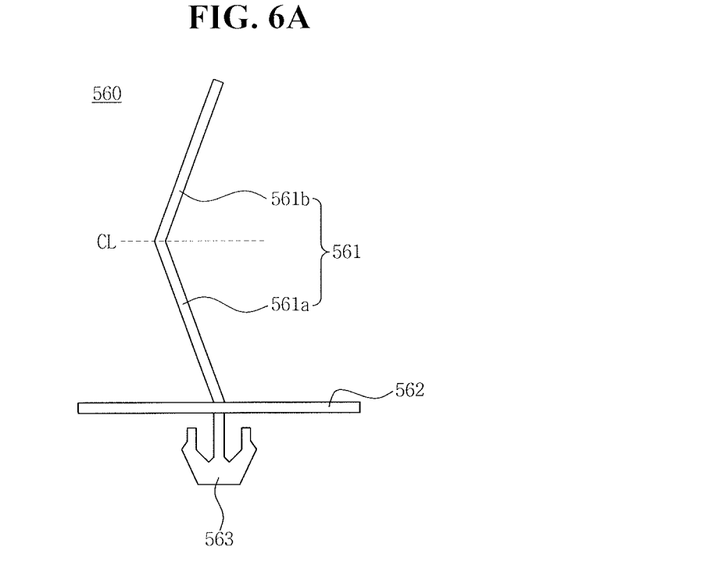
FIGS. 6A to 6F illustrate side views of supporters according to other embodiments.

Referring to FIG. 6A, the supporter 560 according to another embodiment includes identical base portion 562 and coupling projection 563, as those of the supporter 460. However, a support portion 561 of the supporter 560 is bent only with respect to a center line CL. In more detail, a first step 561a of the support portion 561 is connected to the base portion 562 and forms an acute angle with the base portion 562, while a second step 561b forms an obtuse angle with the first step 561a.

Figure 6B:
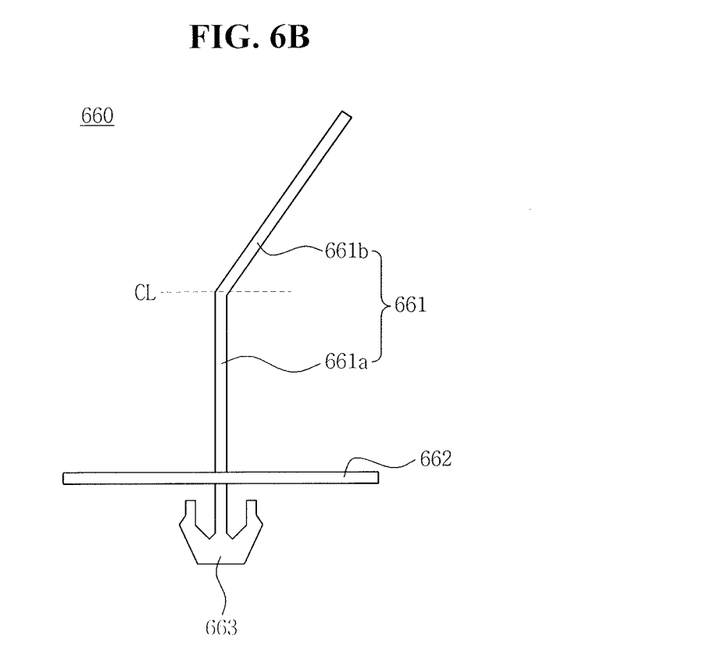

Referring to FIG. 6B, a supporter 660 according to yet another embodiment includes identical base portion 662 and coupling projection 663, as those of the supporter 460. However, a support portion 661 of the supporter 660 is bent only with respect to a center line CL. In more detail, a first step 661a of the support portion 661 is connected to the base portion 662 and is perpendicular to the base portion 662, while a second step 661b forms an obtuse angle with the first step 661a.

Figure 6C:
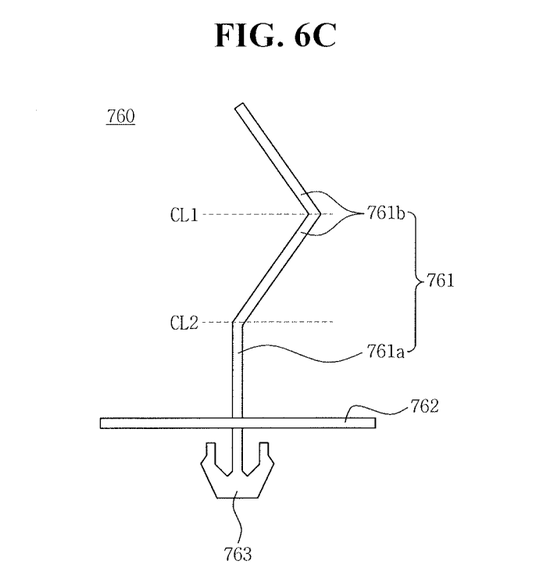

Referring to FIG. 6C, a supporter 760 according to yet another embodiment includes identical base portion 762 and coupling projection 763, as those of the supporter 460. However, a support portion 761 of the supporter 760 is bent twice with respect to first and second center lines CL1 and CL2. In more detail, a first step 761a of the support portion 761 is connected to the base portion 762 and is perpendicular to the base portion 762, while a second step 761b forms an obtuse angle with the first step 761a and is bent at the second center line CL2.

Figure 6D:
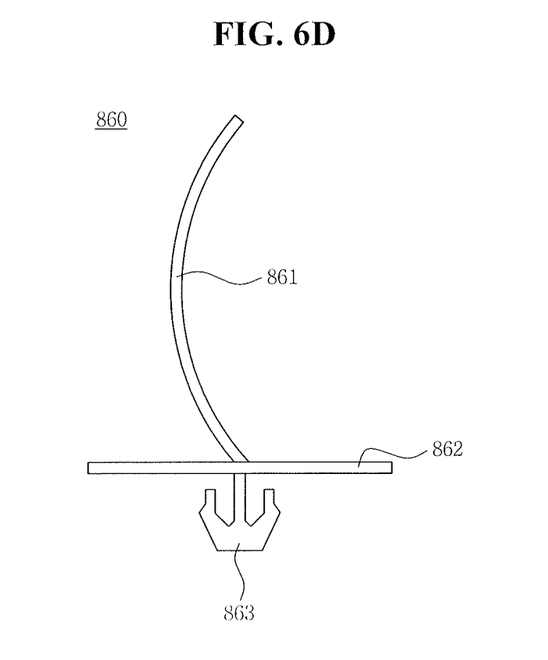

Referring to FIG. 6D, a supporter 860 according to yet another embodiment includes identical base portion 862 and coupling projection 863, as those of the supporter 460. However, a support portion 861 of the supporter 860 has a predetermined curvature. The support portion 861 is not bent with respect to a certain point, and is curved having a predetermined curvature on the whole, i.e., in its entirety.

Figure 6E:
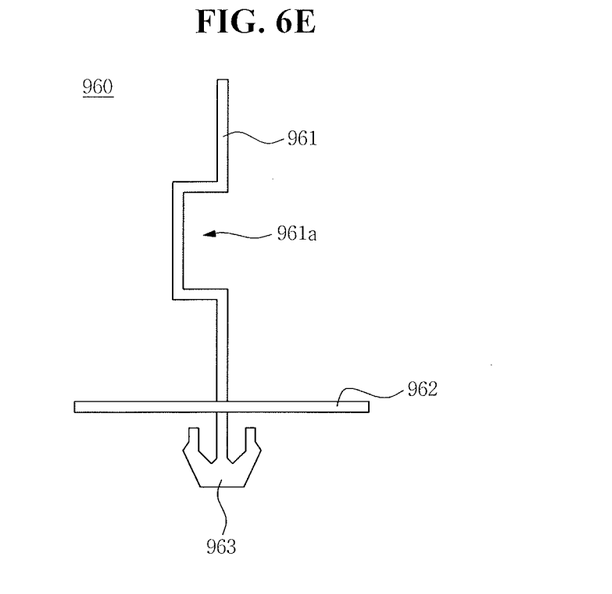

Referring to FIG. 6E, a supporter 960 according to yet another embodiment includes identical base portion 962 and coupling projection 963, as those of the supporter 460. However, a support portion 961 of the supporter 960 has a bent portion 961a that is bent in a direction perpendicular to a longitudinal direction.

Figure 6F:
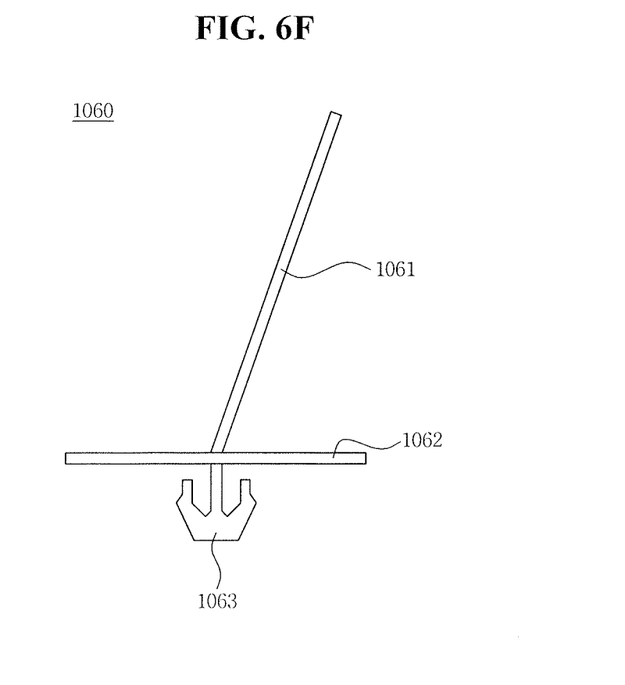

Referring to FIG. 6F, a supporter 1060 according to yet another embodiment includes identical base portion 1062 and coupling projection 1063, as those of the supporter 460. However, a support portion 1061 of the supporter 960 extends from the base portion 1062 and forms an acute angle with the base portion 1062.

By way of summation and review, in order to reduce manufacturing costs of display devices using a direct-lit backlight unit, the number of light sources may be reduced and the thickness of a diffuser plate may be increased. However, when reducing the number of the light sources and increasing the thickness of the diffuser plate in the direct-lit backlight unit to reduce manufacturing costs, a shadow of the supporter, owing to light emitted from the light source, may appear on a screen.

In contrast, embodiments provide a display device with a direct-lit backlight unit, which allows a decrease in the number of light sources and an increase in the thickness of diffuser plates without casting shadows of a supporter on a screen. That is, the display devices includes a supporter that is at least partially bent while supporting a diffuser plate, thereby preventing or substantially minimizing shadow of the supporter on the screen, which in turn, improves image quality.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a display panel;
   a light source providing light to the display panel;
   a bottom chassis, the light source being positioned on the bottom chassis;
   a diffuser plate between the light source and the display panel, the diffuser plate directing light emitted from the light source toward the display panel; and
   a supporter between the bottom chassis and the diffuser plate to support the diffuser plate, the supporter including a support portion that is a flat sheet with a predetermined width in a first direction, the support portion including:
   a first portion that is perpendicular to a bottom of the bottom chassis,
   a second portion that extends from the first portion and is at least partially bent in a second direction perpendicular to the first direction, and
   a third portion that extends from the second portion to the diffuser plate and is perpendicular to the bottom of the bottom chassis, and the first and second directions defining a plane parallel to the bottom of the bottom chassis.

2. The display device as claimed in claim 1, wherein the supporter includes a transparent material.

3. The display device as claimed in claim 1, wherein the third portion of the support portion of the supporter is in contact with the diffuser plate.

4. The display device as claimed in claim 1, wherein the supporter includes:
a base portion connected to the support portion and fixing the support portion to the bottom chassis, the base portion being a flat plate between a bottom portion of the bottom chassis and the support portion; and
a coupling projection protruding from the base portion through the bottom portion of the bottom chassis.

5. The display device as claimed in claim 4, the support portion includes at least two portions defining a non-straight angle therebetween, each one of the two portions defining an oblique angle with the bottom portion of the bottom chassis, and the at least two portions defining the second portion.

6. The display device as claimed in claim 1, wherein the light source includes first, second, third, and fourth light sources respectively disposed at vertices of a quadrangle as viewed in a top view.

7. The display device as claimed in claim 6, wherein the supporter is disposed at a center point of the quadrangle defined by the first, second, third, and fourth light sources.

8. A display device, comprising:
a display panel;
a light source providing light to the display panel;
a bottom chassis, the light source being positioned on the bottom chassis;
a diffuser plate between the light source and the display panel, the diffuser plate directing light emitted from the light source toward the display panel; and
a supporter between the bottom chassis and the diffuser plate to support the diffuser plate, the supporter including:
a base portion fixed to the bottom chassis,
a support portion extending from the base portion and including a first portion that is perpendicular to a bottom of the bottom chassis, a second portion that extends from the first portion and defines an acute angle with the bottom of the bottom chassis, and a third portion that extends from the second portion to the diffuser plate and is perpendicular to the bottom of the bottom chassis, the support portion being a flat sheet with a predetermined width in a first direction and a predetermined thickness in a second direction perpendicular to the first direction, the first and second directions defining a plane parallel to a bottom of the bottom chassis, and
a coupling projection protruding from the base portion.

9. The display device as claimed in claim 8, wherein the supporter includes transparent material.

10. The display device as claimed in claim 8, wherein the third portion of the support portion of the supporter is in contact with the diffuser plate.

11. The display device as claimed in claim 8, wherein the bottom chassis has a coupling hole, the coupling projection being inserted into the coupling hole.

12. The display device as claimed in claim 8, wherein the light source includes first, second, third, and fourth light sources respectively disposed at vertices of a quadrangle as viewed in a top view.

13. The display device as claimed in claim 12, wherein the supporter is disposed at a center point of the quadrangle defined by the first, second, third, and fourth light sources.

14. A display device, comprising:
a display panel;
a light source providing light to the display panel;
a bottom chassis, the light source being positioned on the bottom chassis;
a diffuser plate between the light source and the display panel, the diffuser plate directing light emitted from the light source toward the display panel; and
a supporter between the bottom chassis and the diffuser plate to support the diffuser plate, the supporter including:
a base portion fixed to the bottom chassis,
a support portion extending from the base portion and in contact with the diffuser plate, the support portion being a flat sheet with a predetermined width in a first direction and a predetermined thickness in a second direction perpendicular to the first direction, the support portion has a first portion that is perpendicular to a bottom of the bottom chassis, a second portion that extends from the first portion and is bent in the second direction perpendicular to a longitudinal direction of the support portion, and a third portion that extends from the second portion toward the diffuser plate and is perpendicular to the bottom of the bottom chassis, and
a coupling projection protruding from the base portion.

15. The display device as claimed in claim 14, wherein the supporter includes a transparent material.

16. The display device as claimed in claim 14, wherein the third portion of the support portion of the supporter is in contact with the diffuser plate.

17. The display device as claimed in claim 14, wherein the bottom chassis has a coupling hole, the coupling projection being inserted into the coupling hole.

18. The display device as claimed in claim 14, wherein the light source includes first, second, third, and fourth light sources respectively disposed at vertices of a quadrangle as viewed in a top view.

19. The display device as claimed in claim 18, wherein the supporter is disposed at a center point of the quadrangle defined by the first, second, third, and fourth light sources.

20. The display device as claimed in claim 1, wherein the entirety of the thickness of the support portion is measured between two parallel surfaces of the flat sheet.

* * * * *